T. JARVIS.

Improvement in Garbage-Boxes.

No. 131,617. Patented Sep. 24, 1872.

Witnesses:
E. Wolff
Alex F. Roberts

Inventor:
Theo. Jarvis
Per Munn & Co.
Attorneys.

UNITED STATES PATENT OFFICE.

THEODORE JARVIS, OF NEW YORK, N. Y.

IMPROVEMENT IN GARBAGE-BOXES.

Specification forming part of Letters Patent No. 131,617, dated September 24, 1872.

*To all whom it may concern:*

Figure 1:
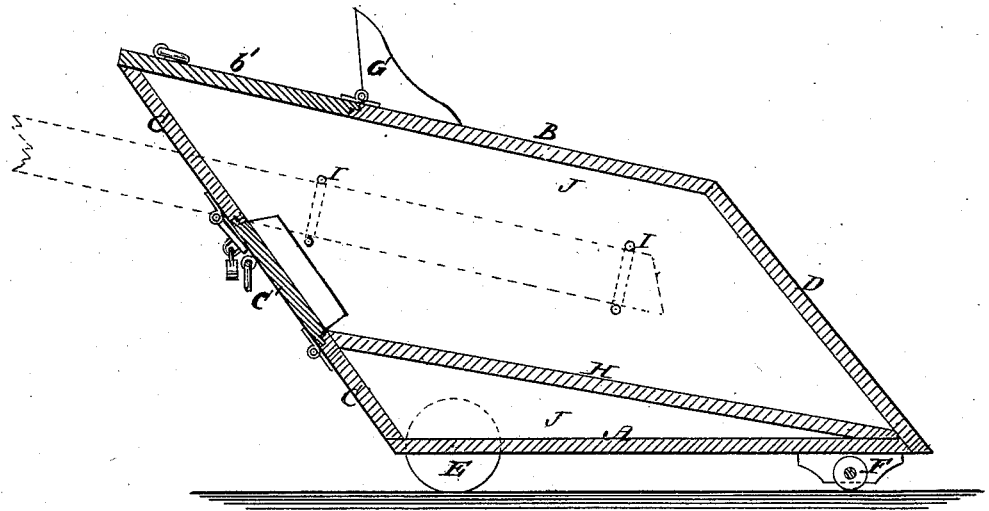
Figure 2:
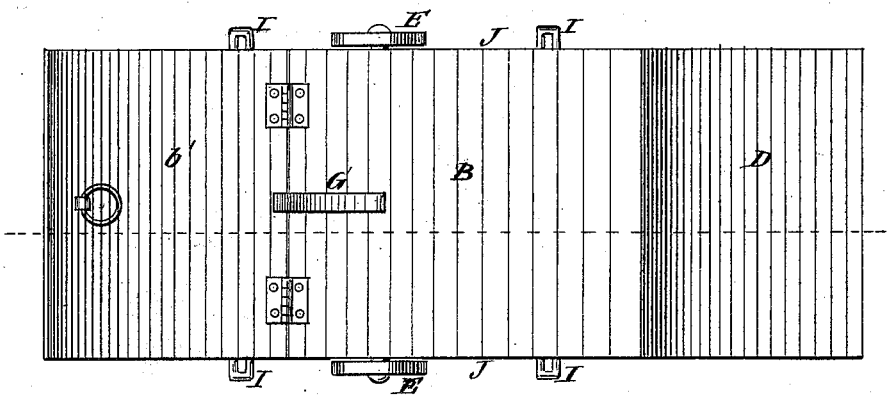

Be it known that I, THEODORE JARVIS, of the city, county, and State of New York, have invented a new and useful Improvement in Garbage-Receptacle, of which the following is a specification:

In the accompanying drawing, Figure 1 is a detail vertical longitudinal section of my improved garbage-receptacle taken through the line $x\ x$, Fig. 2, and Fig. 2 is a top view of the same.

Similar letters of reference indicate corresponding parts.

My invention has for its object to furnish an improved garbage-receptacle, simple in construction and convenient in use, being so constructed that the garbage can be readily shoveled from it into the cart without being scattered over the sidewalk; and it consists in the garbage-receptacle constructed as hereinafter more fully described.

A is the bottom. B is the top. C is the forward end, and D is the rear end. The parts A B C D are all rectangular in form, and the ends C and D are inclined forward, as shown in Fig. 1. The forward end C is made higher than the rear end D, so that the top B may also be inclined. To the side edges of the bottom A, near the forward end C, are pivoted two small wheels, E, and to the said bottom, at the center of its rear end, is pivoted a single wheel, F. The wheels E should be placed in front of but near the vertical line through the center of gravity of the box, so that the box can be readily balanced upon the said wheels E, to raise the rear end of the box upon a curb or other obstruction in moving the box from place to place, the forward end being lifted over said obstruction when the wheels E reach it. When the box is designed to be stationary the wheels E F should be replaced with short legs. In the forward part of the top B is formed a door, $b'$, which is hinged at its rear edge to the stationary part of said top for convenience in throwing in the garbage. To the stationary part of the top B is attached a bracket or stop, G, against which the door $b'$ strikes when opened, and which is so formed as to stop the door in such a position that the vertical line through its center of gravity may be in front of the hinges of the said door, so that the door can never be left open, but will always fall shut when released. In the middle part of the forward end C of the box is formed a door, $c'$, hinged at its lower edge to the upper edge of the lower part of the said end C. The door $c'$ is only opened when the box is to be emptied, and should be provided with side flanges, and with detachable legs or other supports, so that, when opened, it may serve as a continuation of the false bottom H, or as a platform upon which the garbage from the box may be raked, and from which it may be shoveled into the cart. The false bottom H is inclined and extends from the upper edge of the stationary lower part of the forward end C to the angle between the rear end D and the bottom A. When the box is mounted upon wheels E F it should be provided with detachable handles inserted in staples or keepers I, attached to the vertical sides J of the box, as shown in dotted lines in Fig. 1.

Having thus described my invention, I claim as new and desire to secure by Letters Patent—

An improved garbage-receptacle, formed of the bottom A, inclined top B, inclined ends C D, vertical sides J, doors $b'\ c'$, inclined false bottom H, stop G, and wheels E F, or equivalent legs, said parts being constructed and arranged in connection with each other, substantially as herein shown and described, and for the purposes set forth.

THEODORE JARVIS.

Witnesses:
 JAMES T. GRAHAM,
 ALEX. F. ROBERTS.